Aug. 24, 1943.    J. M. HIXON    2,327,789
FISHING TACKLE FLOAT
Filed Feb. 10, 1942
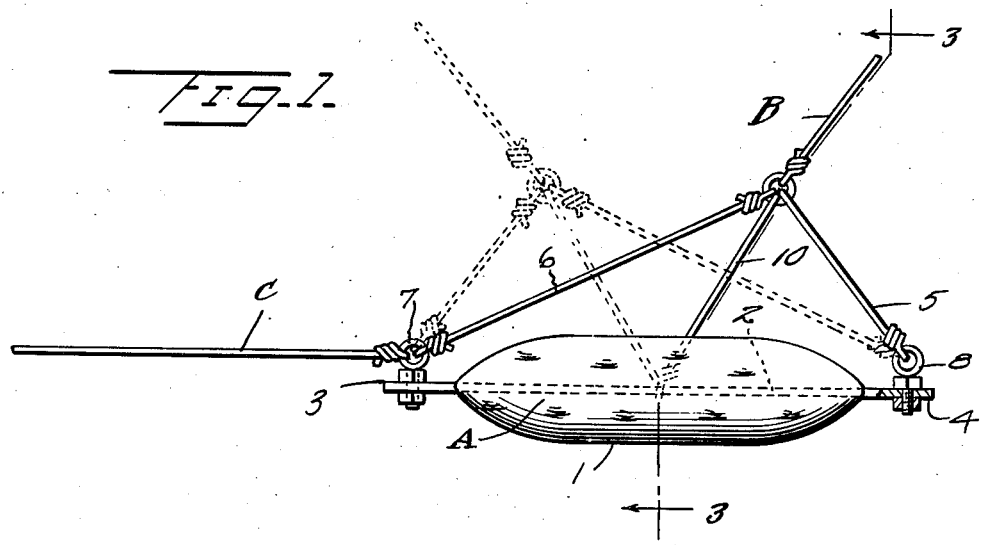
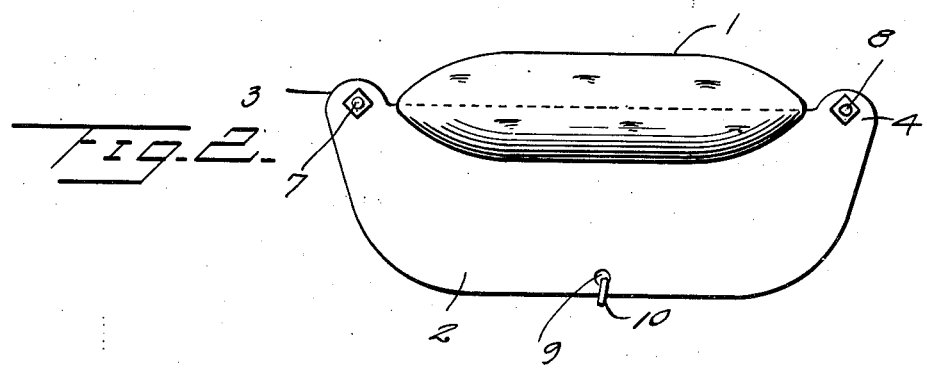
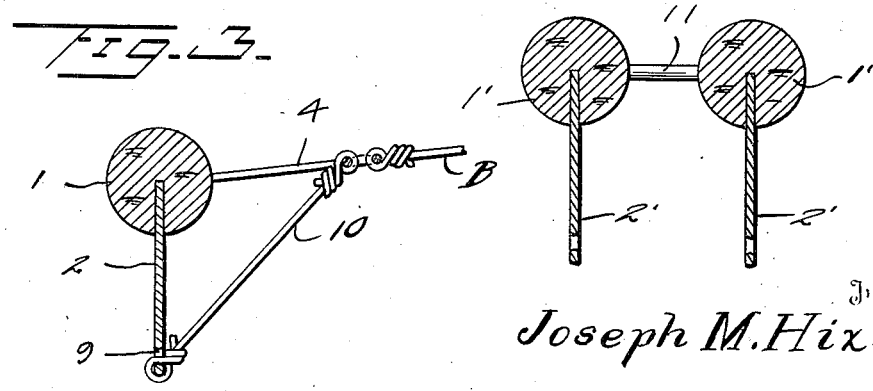
Inventor
Joseph M. Hixon Patented Aug. 24, 1943

2,327,789

UNITED STATES PATENT OFFICE 2,327,789

FISHING TACKLE FLOAT

Joseph M. Hixon, Attica, Ind.

Application February 10, 1942, Serial No. 430,276

1 Claim. (Cl. 43—49)

This invention relates to new and useful improvements in fishing tackle floats.

The primary object of my invention is to provide a fishing tackle float that will permit trolling close to the shoe from a boat travelling at considerable distance off shore, or permit fishing from the shore in flowing water.

A further object of my invention is to provide a fiashing tackle float that will cause the bait to travel laterally away from the trolling boat, or from the shore in flowing or moving water.

With the foregoing and other objects in view that will appear as the nature of my invention is better understood, the same consists in the novel features of construction, combination and arrangement of parts illustrated in the accompanying drawing and more particularly pointed out in the appended claim.

In the accompanying drawing, which is for illustrative purposes only and is therefore not drawn to scale:

Figure 1 is a plan view of a fishing tackle float, embodying my improvements.

Figure 2 is a side elevation of the float.

Figure 3 is a vertical transverse section, taken on line 3—3 of Figure 1 and Figure 4 is a cross sectional view of a modified form of my invention, showing the use of two floats.

Referring to the drawing for a more particular description of my invention, and in which drawing like parts are designated by like reference characters throughout the several views, A designates the fishing tackle float, as a whole, B the connecting or controlling line and C the bait end of the line.

Specifically, my invention comprises the elongated float 1, which lays or rests on the surface of the water and is constructed of cork, light wood, hollow metal or other suitable material. The float is preferably of cylindrical form in cross section, as shown.

In carrying out my invention, the float is provided with the straight central depending fin 2, which extends downwardly into the water. The connecting or controlling line B is connected to the opposite upper corners 3 and 4 of the fin 2, by the longer and shorter diagonally disposed reversely inclined lines 5 and 6, respectively, and the eye bolts 7 and 8. The line B is also connected to the central perforated portion 9 at the bottom edge of the fin 2, by the transverse stay line 10. This stabilizes the float and eliminates the need of a weight or other similar device for the float.

It will be noted that the controlling line B is disposed at an angle to the float to propel the bait end of the line laterally away from the trolling boat or from the shore in flowing water; in other words, the principle of the kite is applied to my improved fishing tackle float, which is a water device.

In the modified form of my invention illustrated in Figure 4 of the drawing, the device comprises the corresponding parallel floats 1', with straight central depending fins 2'. The floats 1' are connected together, as shown, by one or more transverse rods 11.

From the foregoing description taken in connection with the drawing, it is thought that the construction, operation and advantages of my invention will be readily understood, without requiring a more extended explanation.

Various changes in the form, proportions and minor details of construction may be resorted to without departing from the principles or sacrificing any of the advantages of my invention as defined in the appended claim.

Having described my invention, what I claim as new and desire to secure by Letters Patent, is:

A fishing tackle float of the character specified, comprising an elongated float of cylindrical form in cross section, a straight central fin extending from the bottom of the float into the water, said fin being provided near its bottom edge with a centrally disposed perforation, a controlling line extending laterally and at an angle from one side of the float to the trolling boat or shore, a diagonally disposed connecting line extending between the controlling line and one upper corner of the central fin, a longer diagonally disposed connecting line extending between the controlling line and the opposite upper corner of the fin, eye bolts for attaching the diagonally disposed connecting lines to the fin, and a transverse intermediate stay line extending from the controlling line and connected to the perforated portion of the fin.

JOSEPH M. HIXON.